(12) United States Patent
Motoyoshi et al.

(10) Patent No.: US 8,666,320 B2
(45) Date of Patent: Mar. 4, 2014

(54) RADIO WAVE PROPAGATION CHARACTERISTIC ESTIMATING SYSTEM, ITS METHOD, AND PROGRAM

(75) Inventors: Masahiro Motoyoshi, Tokyo (JP); Hiroto Sugahara, Tokyo (JP)

(73) Assignee: NEC Corporation, Tokyo (JP)

( * ) Notice: Subject to any disclaimer, the term of this patent is extended or adjusted under 35 U.S.C. 154(b) by 1172 days.

(21) Appl. No.: 12/527,521

(22) PCT Filed: Feb. 15, 2008

(86) PCT No.: PCT/JP2008/052549
§ 371 (c)(1),
(2), (4) Date: Aug. 17, 2009

(87) PCT Pub. No.: WO2008/099927
PCT Pub. Date: Aug. 21, 2008

(65) Prior Publication Data
US 2010/0081390 A1    Apr. 1, 2010

(30) Foreign Application Priority Data
Feb. 16, 2007    (JP) .................................. 2007-036340

(51) Int. Cl.
*H04B 17/00*    (2006.01)
(52) U.S. Cl.
USPC ...................................................... 455/67.11
(58) Field of Classification Search
USPC .............. 455/446, 448, 449, 453, 457, 67.11, 455/63.1
See application file for complete search history.

(56) References Cited

U.S. PATENT DOCUMENTS 4,949,268 A * 8/1990 Nishikawa et al. ............ 701/454
5,890,076 A * 3/1999 Takano et al. .................. 455/561
(Continued)

FOREIGN PATENT DOCUMENTS

JP    06004682 A  *  1/1994    ............. G06F 15/72
JP    09-33584          2/1997
(Continued)

OTHER PUBLICATIONS

Machine Translation of JP 06004682 A.*
(Continued)

*Primary Examiner* — Yuwen Pan
*Assistant Examiner* — Mark Woodall
(74) *Attorney, Agent, or Firm* — Scully Scott Murphy & Presser PC (57) ABSTRACT

The amount of operation processing is reduced without largely degrading an estimation precision of radio wave propagation estimation.
The radio wave propagation characteristic estimating system for estimating a radio wave propagation characteristic by taking into decision-theoretical consideration such a structure as a building or indoor furnishings includes the object selecting unit for selecting, from objects within a region to be analyzed, an object whose effect on an estimation precision is small by using position data of a transmission point, the number of constituent faces reducing unit for reducing the number of constituent faces of the selected object, and the radio wave propagation estimating unit for estimating radio wave propagation by using an object within the region to be analyzed which is not selected by the object selecting unit and an object whose number of constituent faces is reduced by the number of constituent faces reducing unit.

11 Claims, 9 Drawing Sheets

(56) References Cited

U.S. PATENT DOCUMENTS

| | | | |
|---|---|---|---|
| 6,021,316 A * | 2/2000 | Heiska et al. | 455/67.16 |
| 6,341,223 B1 * | 1/2002 | Park | 455/446 |
| 6,442,507 B1 * | 8/2002 | Skidmore et al. | 702/186 |
| 6,785,547 B1 * | 8/2004 | Heiska et al. | 455/446 |
| 7,746,343 B1 * | 6/2010 | Charaniya et al. | 345/428 |
| 2002/0010741 A1 | 1/2002 | Stewart et al. | |
| 2002/0094809 A1 * | 7/2002 | Watanabe et al. | 455/423 |
| 2003/0014224 A1 * | 1/2003 | Guo et al. | 703/1 |
| 2003/0023412 A1 * | 1/2003 | Rappaport et al. | 703/1 |
| 2003/0073442 A1 * | 4/2003 | Fattouch | 455/446 |
| 2004/0192314 A1 * | 9/2004 | Watanabe et al. | 455/446 |
| 2004/0259555 A1 * | 12/2004 | Rappaport et al. | 455/446 |
| 2008/0268876 A1 * | 10/2008 | Gelfand et al. | 455/457 |
| 2009/0132210 A1 * | 5/2009 | Royan et al. | 703/1 |
| 2009/0319236 A1 * | 12/2009 | Blaunshtein et al. | 703/1 |
| 2010/0060631 A1 * | 3/2010 | Sugihara | 345/419 |

FOREIGN PATENT DOCUMENTS

| | | | | |
|---|---|---|---|---|
| JP | H09-153867 A | 6/1997 | | |
| JP | H10-062468 A | 3/1998 | | |
| JP | 2005-72667 A | 3/2005 | | |
| JP | 2006-284704 A | 10/2006 | | |
| JP | 2006-287685 A | 10/2006 | | |
| JP | 2007-101376 A | 4/2007 | | |
| WO | WO 2005088868 A1 * | 9/2005 | | H04B 7/26 |

OTHER PUBLICATIONS

Machine Translation of JP 09153867 A.*

Imai T. et al., "A Propagation Prediction System for Urban Area Using Ray-Tracing Method", *The Institute of Electronics, Information and Communication Engineers* 97(132):31-38 (Jun. 24, 1997), together with an English-language abstract.

Official Action dated Mar. 7, 2012 received from the Japanese Patent Office from related Japanese Application No. 2008-558152, together with an English-language translation.

Hoppe, Hugues, "Progressive Meshes", *Computer Graphics* (1996) pp. 99-108.

Fugii, Teruya et al., "Kotaiiki Ido Denpan" *NTT DoCoMo Technical Journal* (2000) pp. 60-69, vol. 8(2).

* cited by examiner

RADIO WAVE PROPAGATION CHARACTERISTIC ESTIMATING SYSTEM, ITS METHOD, AND PROGRAM

TECHNICAL FIELD

The present invention relates to a system for estimating a propagation condition of radio waves from a base station, a radio apparatus or the like (transmission point) in a radio communication system, and a method and a program thereof and, more particularly, a system for estimating a propagation condition of radio waves at a high speed while reducing processing of searching a locus of a ray by reducing the number of constituent faces of an object whose effect on an estimation precision is small by using position data of a transmission point, and a method and a program thereof.

BACKGROUND ART

For supporting placement of a base station, a radio apparatus and like in a radio communication system, used is a radio propagation characteristic estimating system (radio propagation simulator). Reception power or an expansion of a delay at an arbitrary reception point is evaluated by a radio propagation simulator to determine a position at which a transmission station is to be disposed, thereby ensuring a plane communicable area and achieving reduction in the number of base stations to be placed and the like.

Roughly speaking, radio propagation simulation is realized by a statistical method and a method using the decision theory.

Statistical method is a method of determining a parameter, with an estimation expression of a propagation loss provided to have a distance, a frequency or the like as an argument, by multivariate analysis or the like based on numerous data obtained by actual measurement of a propagation loss. While in general, radio wave propagation varies with place according to reflection on or transmission through an object, a median of variation with place is given by a method using the statistical theory. It is therefore impossible to precisely reflect an effect exerted on radio waves by a wall or an indoor object. As a result, the statistical method fails to estimate a radio wave propagation condition with high precision.

On the other hand, in the method using the decision theory, considering radio waves radiated from an antenna as a set of numbers of radio waves (rays) and assuming that each ray repeats reflection and transmission geometric-optically to propagate, rays reaching an observation point are composed to obtain a propagation loss or a delay. This method is called the ray tracing method. In the ray tracing method, since estimation is made taking into decision-theoretical consideration the effect caused by reflection, transmission and diffraction of an irradiated ray on an object within a region to be analyzed, radio wave propagation can be estimated with high precision. When there are many objects within a region to be analyzed, however, processing of searching a reflection point or a diffraction point is increased, resulting in increasing the amount of operation processing. As a result, radio wave propagation estimation will require much time.

In order to solve the problem in the method using the decision theory, Patent Literature 1, for example, discloses the method of speeding up propagation estimation by reducing the number of objects to be taken into consideration at the time of the ray searching processing. More specifically, recited is the ray searching processing executed by searching a road from a transmission point to a reception point and a path to a crossing in advance to limit a path of a ray and excluding an object apart from the searched path from targets to be considered. The method recited in Patent Literature 1 is effective when a height of a transmission point is smaller than a surrounding building such as a street micro cell.

On the other hand, as a usage of three-dimensional map drawing, Patent Literature 2, for example, discloses the method of reducing loads on drawing by visually combining buildings whose importance is low. More specifically, in the method, importance of an object is determined based on a volume (or surface area), complicity of a shape and attributes of the object to combine elements adjacent to each other with respect to an element whose importance is smaller than a predetermined threshold value. Attribute here is determined by a relative height with respect to an adjacent object, a distance to adjacent objects and whether it is at a crossing or not. In other words, an object whose volume is large, whose shape is complicated, whose height is larger than an adjacent object, which has no object in its surroundings or which faces the corner of the crossing is considered to have high importance and excluded from targets to be combined. Conversely, other objects than those described above are considered as low-importance objects and combined.

Patent Literature 1: Japanese Patent Laying-Open No. 09-33584.

Patent Literature 2: Japanese Patent Laying-Open No. 2006-284704.

Non Patent Literature 2: H. Hoppe, "Progressive Meshes", Computer Graphics (Proc. ACM SIGGRAPH), pp. 99-108, 1996.

The method recited in Patent Literature 1, however, has a problem that in such a case of a macro cell often used in a cellular phone network where a height of a transmission point is larger than a surrounding building, an estimation error will be increased. The reason is that in the method of Patent Literature 1, effects of a building not in proximity to a road and a crossing which is excluded from a target to be considered will not be ignorable in propagation estimation in a macro cell.

The method recited in Patent Literature 2, which is basically a manner of reducing loads on three-dimensional map drawing, might have a building combined which will largely affect an estimation precision of radio propagation estimation. As a result, an estimation error will be naturally increased. More specifically, while when estimating a propagation condition of radio waves from a transmission point of a macro cell to a road, a building whose height is smaller than the transmission point is crucial, such a building is considered to have low importance and combined in the method recited in Patent Literature 2.

An object of the present invention is to provide a system, a method and a program for estimating a radio wave propagation condition at a high speed by reducing the number of constituent faces of an object which has a small effect on an estimation precision by using position data of a transmission point.

SUMMARY

The effect of the present invention is to reduce the amount of ray searching processing and a volume of data of an object to be stored by reducing the number of constituent faces of an object to be taken into consideration at the time of propagation estimation.

EXEMPLARY EMBODIMENT

In the following, best modes for implementing the present invention will be detailed with reference to the drawings.

First Exemplary Embodiment

Figure 1:
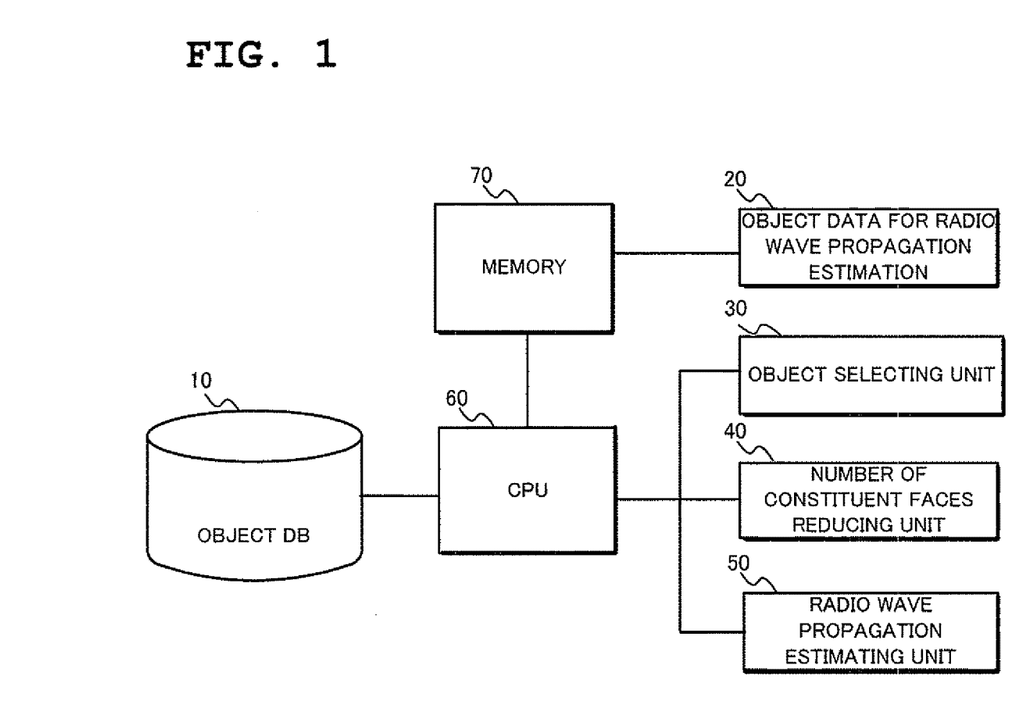
FIG. 1 is a functional block diagram showing first, second and third exemplary embodiments of a radio wave propagation estimating system according to the present invention.

FIG. 1 is a functional block diagram showing a first exemplary embodiment of a radio wave propagation estimating system according to the present invention. With reference to FIG. 1, the first exemplary embodiment of the present invention includes an object data base (DB) 10, object data 20 for radio wave propagation estimation, an object selecting unit 30, a number of constituent faces reducing unit 40, a radio wave propagation estimating unit 50, a control unit (CPU) 60 and a memory 70.

The object DB 10 is a data base in which coordinate data is stored indicative of a position and a shape of an outdoor or indoor structure (object) such as a building or indoor furnishings. Stored in the object DB 10 is data which faithfully reproduces a position and a shape of an actual structure. In a case of an outdoor structure, a three-dimensional digital map data base on the market can be used as the object DB 10.

The object data 20 for radio wave propagation estimation, which is data of an object in the surroundings of a transmission point to be taken into consideration in radio wave propagation estimation, is data processed by the object selecting unit 30 and the number of constituent faces reducing unit 40 which will be described later.

The object selecting unit 30 has a function of selecting an object whose effect on an estimation precision is small by using position data of a transmission point out of data obtained in the surroundings of the transmission point to be taken into consideration in radio wave propagation estimation among data stored in the object DB 10 and transferring data of the selected object to the number of constituent faces reducing unit 40, as well as considering data of an object not selected as object data 20 for radio propagation estimation.

The number of constituent faces reducing unit 40 has a function of executing processing of reducing the number of constituent faces of an object selected by the object selecting unit 30 and adding data of the processed object to the object data 20 for radio wave propagation estimation.

The radio wave propagation estimating unit 50 has a function of estimating a radio wave propagation characteristic by using the object data 20 for radio wave propagation estimation.

The control unit (CPU) 60 has a function of controlling operation of each of the units 30 through 50 and the memory 70 functions as a working memory of the CPU.

Figure 2:
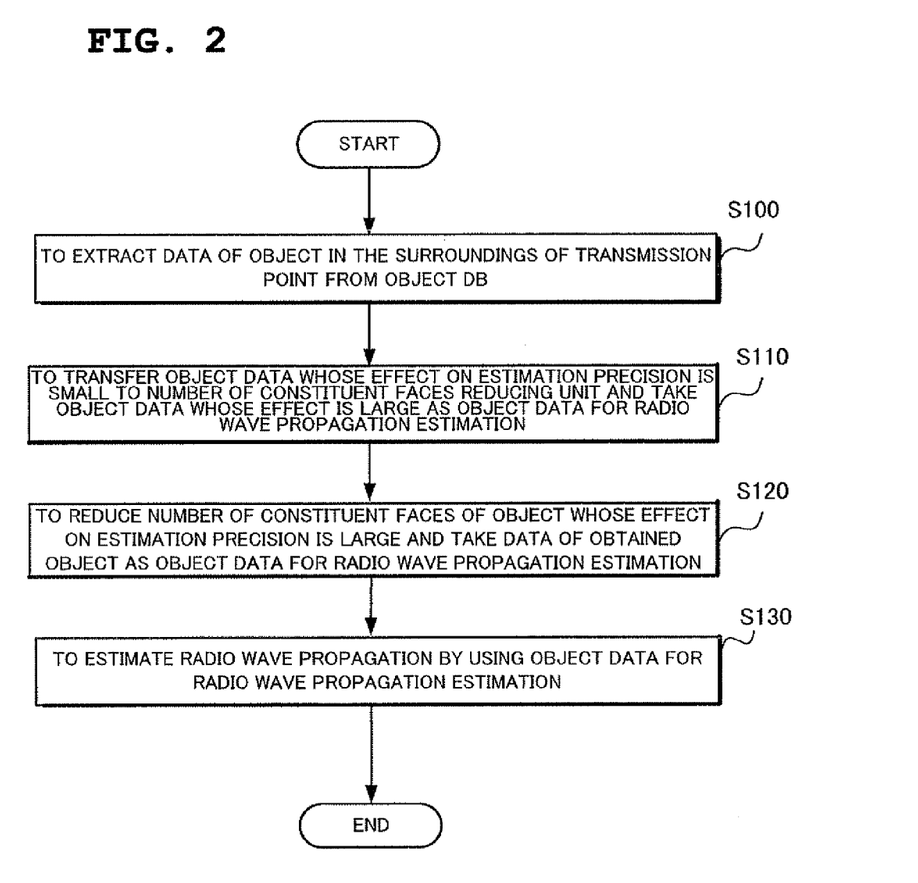
FIG. 2 is a flow chart showing the first, second and third exemplary embodiments of the radio wave propagation estimating system according to the present invention.

FIG. 2 is a flow chart showing operation of the first exemplary embodiment. According to the first exemplary embodiment of the present invention, first, for estimating radio wave propagation, extract data of an object in the surroundings of a transmission point from the object DB 10 (Step S100).

Next, from the data extracted at Step S100, select an object whose effect on an estimation precision is small by using position data of the transmission point by the object selecting unit 30 and transfer data of the selected object to the number of constituent faces reducing unit 40, as well as considering data of an object not selected as the object data 20 for radio wave propagation estimation (Step S110). A specific object selecting method at Step S110 will be described later.

Next, execute the processing of reducing the number of constituent faces of the object selected at Step S110 by the number of constituent faces reducing unit 40 to add data of the processed object to the object data 20 for radio wave propagation estimation (Step S120). A specific method of reducing the number of constituent faces at Step S120 will be described later.

Furthermore, by using the object data 20 for radio wave propagation estimation, execute radio wave propagation estimation by such a radio wave propagation estimating method as the above-described ray tracing by the radio wave propagation estimating unit 50 (Step S130).

Figure 3:
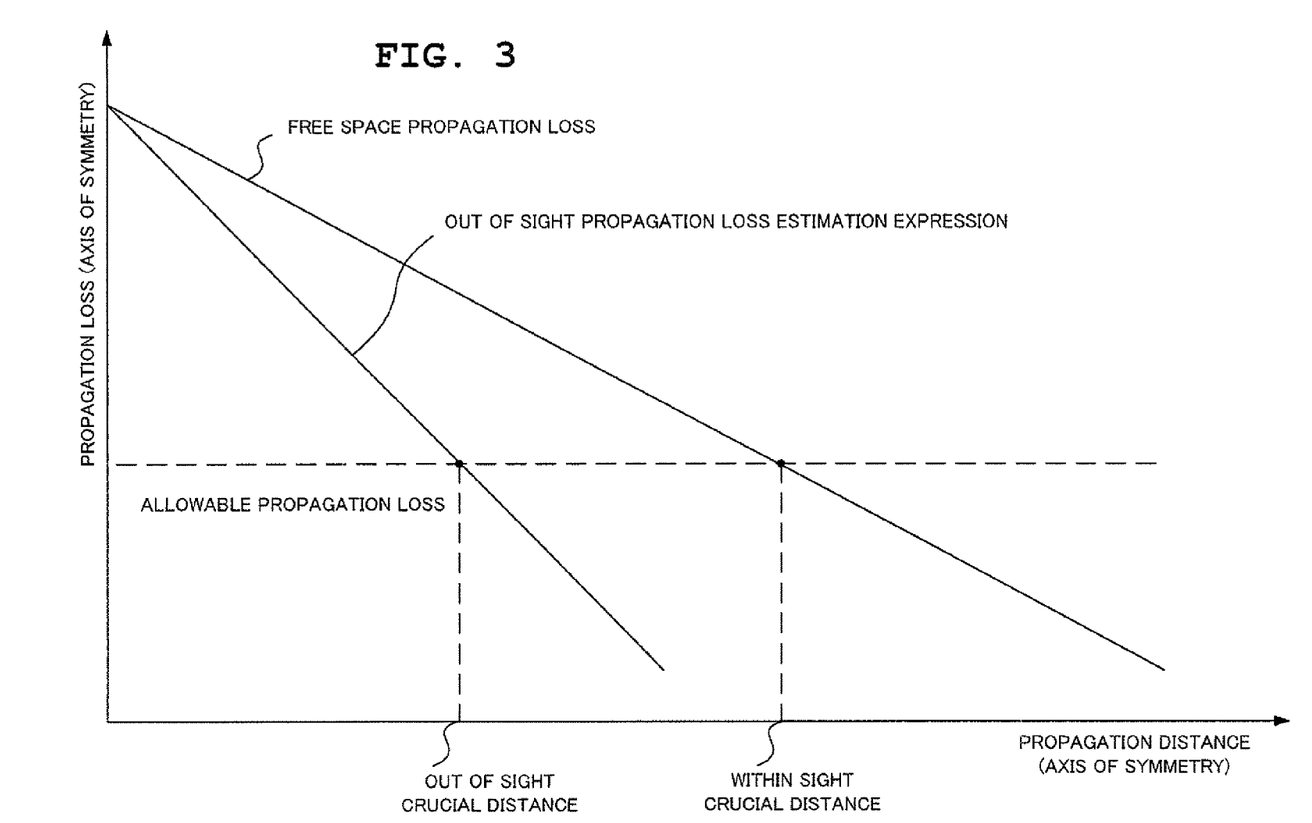
FIG. 3 is a diagram for use in explaining a manner of selecting a target whose number of constituent faces is to be reduced by classifying objects into objects out of sight and objects within sight.

Shown is one example of specific object selecting methods by the object selecting unit 30 at Step S110. First, make determination on sight between a transmission point and a vertex of each object to classify an object having at least one vertex being within sight as an object within sight and an object having every vertex being out of sight as an object out of sight. Next, with respect to an object classified as being within sight, when a distance from the transmission point to a representative point of the object is longer than a distance defined based on a propagation loss expression in free space (crucial distance within sight), select the object as a target whose number of constituent faces is to be reduced (FIG. 3).

Used as a representative point of an object is, for example, the center of gravity of the object. Used as a crucial distance within sight is a distance at which a propagation loss in free space will be, for example, an allowable propagation loss of a radio communication system whose radio wave propagation is to be estimated. On the other hand, as to an object classified as being an object out of sight, when a distance from the transmission point to a representative point of the object is longer than a distance defined based on an expression of an out-of-sight propagation loss (out-of-sight crucial distance), select the object as a target whose number of constituent faces is to be reduced (FIG. 3). As to an expression of an out-of-sight propagation loss, it is desirable to use such an estimation expression which enables a radio wave condition in an urban area crowded with buildings to be estimated as by Okumura—Hata System, Walfisch—Ikegami System and Sakaue System, for example. As an out-of-sight crucial distance, used is a distance at which the above-described out-of-sight propagation loss will be, for example, an allowable propagation loss of a radio communication system whose radio wave propagation is to be estimated.

While at the above-described Step S110, determination on sight is made between the transmission point and every vertex of each object, it is possible to make determination on sight by using a representative one point such as the center of gravity of each object, for example, by taking an increase in the amount of operation processing caused by sight determination into consideration. Alternatively, without executing sight determination processing, a target whose number of constituent faces is to be reduced may be selected by using a crucial distance defined based on the same propagation loss expression with respect to all the objects. Alternatively, it is also possible to make determination on sight to select all the objects classified into objects out of sight as a target whose number of constituent faces is to be reduced.

Methods of reducing the number of constituent faces by the number of constituent face reducing unit 40 at Step S120 include three methods, a method of combining objects, a method of reducing objects and a method of simplifying a shape of an object.

First, description will be made of a method of combining a plurality of objects which is the first method of reducing the number of constituent faces. First, extract a plurality of adjacent objects as a group to be combined from among objects selected at Step S110. When a polygon indicative of a town zone is stored in map data, for example, extract objects within the same town zone polygon as a group to be combined. In general, under the construction conditions of structures in an urban area, a space between adjacent structures in the same town zone is small, so that a combination loss caused by combining structures in the town zone (change of an object shape caused by combining) is small.

On the other hand, when no polygon indicative of a town zone is stored in map data, extract an object whose shortest distance between vertexes is not more than a predetermined threshold value as a group to be combined. Here, with respect to at least one object belonging to the group to be combined, an object whose shortest distance between its vertex and a vertex of that one object is not more than the above-described threshold value is extracted as a group to be combined. In a case, for example, where the above-described threshold value is 3m, the shortest distance between vertexes of an object A and an object B is 2m and the shortest distance between vertexes of the object B and an object C is 1m, even when the shortest distance between the object A and the object C is 5m which exceeds the above-described threshold value, all the objects A, B and C are selected as the same group to be combined. According to the present method, since objects whose distance from each other is small are classified into a group to be combined, a combination loss is naturally small.

Next, with respect to the extracted group to be combined, execute further processing taking an altitude on a top face (top face altitude) of an object in the group into consideration. When a height of a vertex of a top face is not all equal, a mean value of the same is taken as a top face altitude. More specifically, when as to an object extracted in the group to be combined, for example, a difference between a maximum value and a minimum value of the top face altitudes exceeds a predetermined threshold value, processing can be to determine that a combination loss in a direction of height which is caused by combination is large and exclude all the objects in the group to be combined from targets to be combined. Alternatively, the processing can be to divide objects in the group to be combined into sub groups. More specifically, executed for all the objects in the group to be combined is processing of, with objects adjacent to each other (whose shortest distance between vertexes or whose top face altitude difference will be not more than a predetermined threshold value) in the group to be combined as a sub group, making the same determination with respect to other object based on an average top face altitude of the sub group to sequentially increase a member of the sub group.

Figure 4:
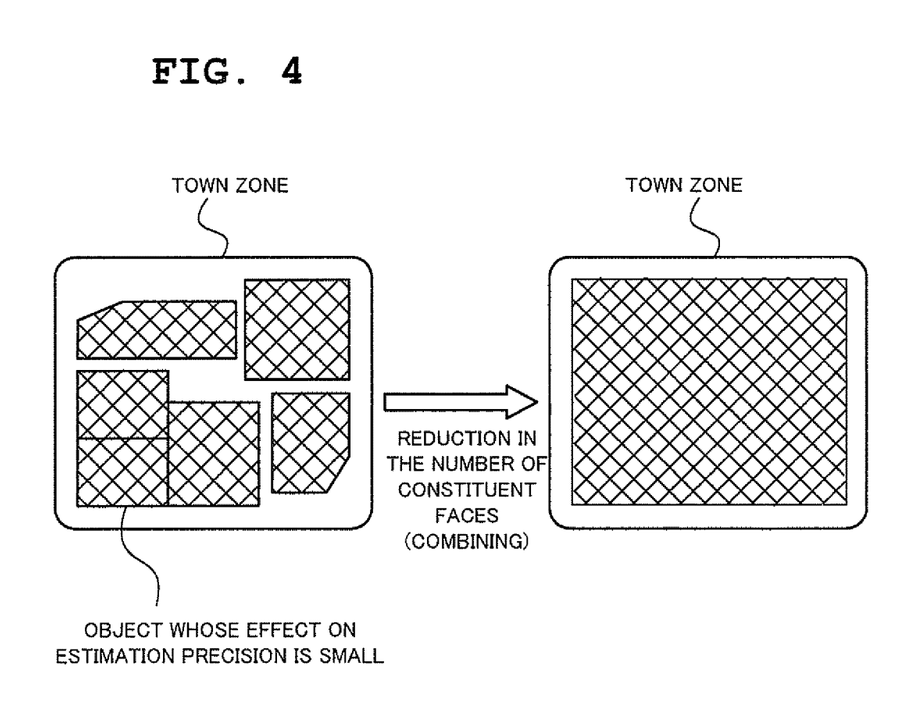
FIG. 4 is a diagram for use in explaining a manner of reducing the number of constituent faces by combining adjacent objects.
Figure 5:
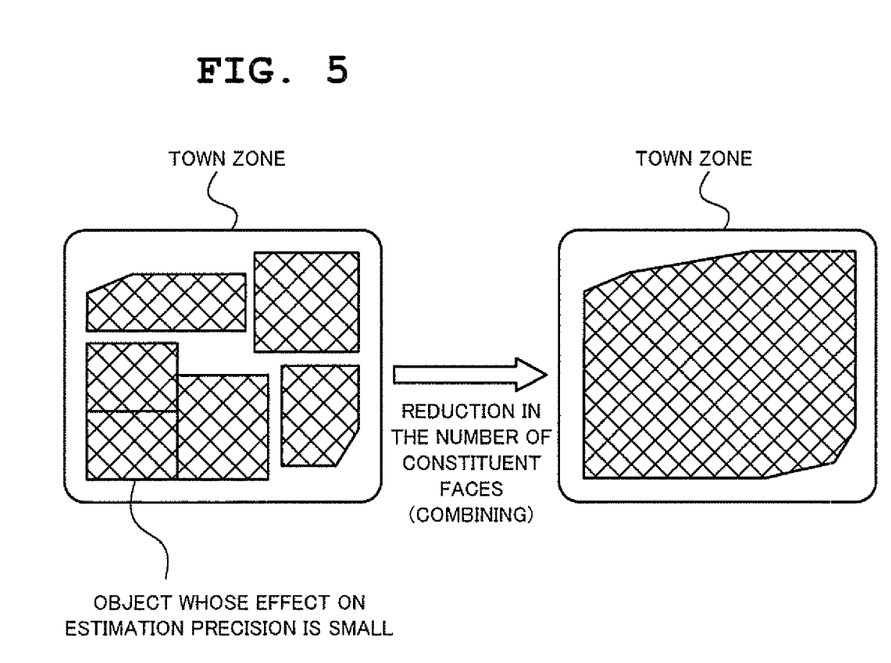
FIG. 5 is a diagram for use in explaining a manner of reducing the number of constituent faces by combining adjacent objects.

Next, combine the objects in the group into one object. As a specific combining method, it is possible to use a method of, for example, calculating a maximum value and a minimum value of a vertex coordinate of an object in the above-described sub group and forming an object with these values as new vertexes (FIG. 4). Alternatively, a convex closure (a minimum convex closure including a certain point set) is calculated from a vertex of an object in the group to consider the result as an object as of after combination (FIG. 5). As a top face altitude of an object as of after combination, it is desirable to use a mean value of a top face altitude of an object as of before combination.

Figure 6:
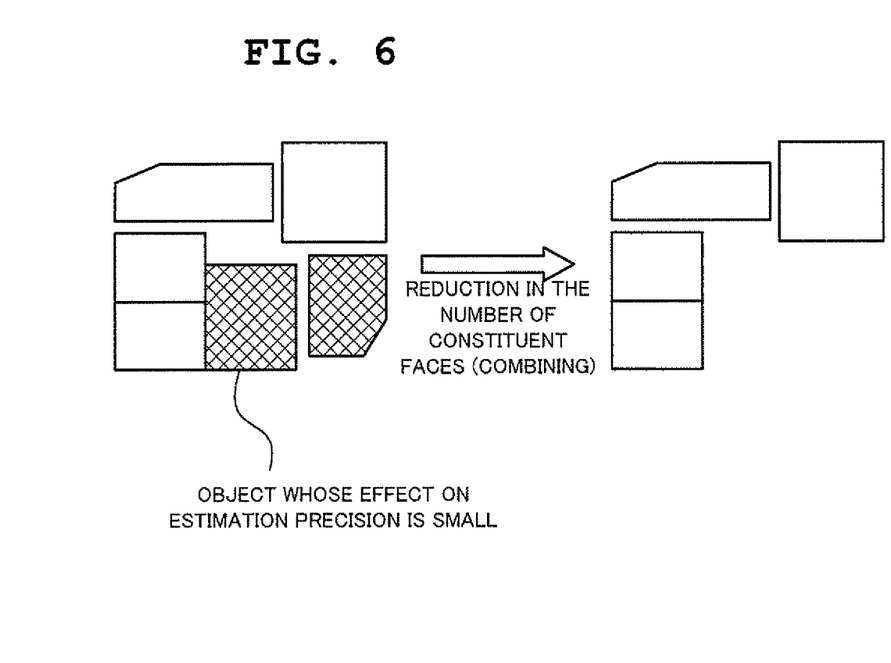
FIG. 6 is a diagram for use in explaining a manner of reducing the number of constituent faces by deleting an object.

Description will be made of a method of deleting an object which is the second method of reducing the number of constituent faces. This method is to simply delete an object selected at Step S110 (FIG. 6).

Figure 7:
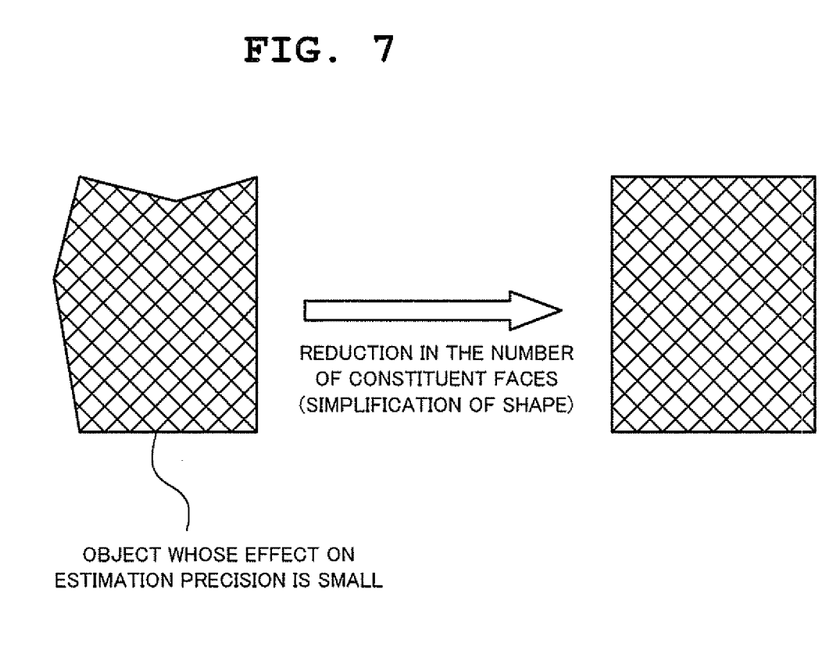
FIG. 7 is a diagram for use in explaining a manner of reducing the number of constituent faces by simplifying a shape of an object.

Description will be made of a method of simplifying a shape of an object which is the third method of reducing the number of constituent faces. This method is realized by applying, to an individual object selected at Step S110, the method in which a maximum value and a minimum value of a vertex are used as new vertexes or the method in which a convex closure is calculated from a vertex of an object, which methods are shown in the above-described object combining methods (FIG. 7). An existing method of simplifying a common solid shape can be also used. Among polygon model automatic simplification methods is, for example, the method recited in Non-Patent Literature 1.

Effect of the First Exemplary Embodiment

According to the present exemplary embodiment, select an object whose effect on an estimation precision is small by using position data of a transmission point to take coordinate data of an object not selected whose effect on an estimation precision is large as the object data 20 for radio wave propagation estimation at Step S110, execute the processing of reducing the number of constituent faces of the object selected at Step S110 to add coordinate data of the object processed to the object data 20 for radio wave propagation estimation at Step S120 and estimate radio wave propagation by using the object data 20 for radio wave propagation estimation at Step S130. As a result, the amount of operation processing can be reduced while suppressing degradation of an estimation precision.

Second Exemplary Embodiment

Next, a second exemplary embodiment of the present invention will be described. Structure of the second exemplary embodiment of the present invention is the same as that of the first exemplary embodiment shown in FIG. 1. The second exemplary embodiment differs from the first exemplary embodiment of the present invention in the specific object selecting method at Step S110 and in the specific number of constituent faces reducing method at Step S120 in the flow chart.

At Step S110 in the present exemplary embodiment, select an object whose top face altitude is higher than a transmission point as a target whose number of constituent faces is to be reduced. In a case where a height of a vertex of a top face is not all the same, its mean value will be taken as a top face altitude.

At Step 8120 in the present exemplary embodiment, used is the method of combining objects which is shown in the first exemplary embodiment.

Since in radio wave propagation estimation of an outdoor macro cell, there exists no medium that reflects downwards a radio wave going upwards such as an indoor ceiling, a radio wave reflected on or transmitted through a part higher than a transmission point of an object barely reaches a ground. When estimating an outdoor radio wave condition, it is accordingly unnecessary to strictly set a top face altitude of an object whose top face exists at a region whose altitude is higher than that of a transmission point. It is therefore possible to select even objects whose top face altitudes are largely different as a target whose number of constituent faces is to be reduced at Step S110.

Effect of the Second Exemplary Embodiment

The present exemplary embodiment enables reduction in the amount of operation processing while suppressing degradation of an estimation precision caused by a shape change by combining adjacent objects whose top face altitude is higher than a transmission point.

Third Exemplary Embodiment

Next, a third exemplary embodiment of the present invention will be described. Structure of the third exemplary embodiment of the present invention is the same that of the first exemplary embodiment shown in FIG. 1. Assume, however, that the object data 10 of the third exemplary embodiment fails to have information about a height of each object stored and that information about attributes is stored in place. Attributes of an object are, in a case of the outdoors, a kind of building such as a hotel, an office building, an apartment and a house and in a case of the indoors, a kind of layout articles such as a desk, shelf and a partition. The third exemplary embodiment of the present invention differs from the first exemplary embodiment of the present invention in the specific method of reducing the number of constituent faces at Step S120 in the flow chart.

At Step S120 in the present exemplary embodiment, with respect to a group to be combined, an attribute of an object is taken into consideration in place of an altitude of a top face (top face altitude) of an object in the group.

More specifically, when as to extracted objects in the group to be combined, for example, attributes of the objects are not the same, the processing may be to determine that a combination loss in a height direction caused by combination is large and exclude all the objects in the group to be combined from targets to be combined. Alternatively, it may be processing of dividing objects in a group to be combined into sub groups. More specifically, with objects adjacent to each other (whose shortest distance between vertexes is not more than a predetermined threshold value and which have the same attribute) in a group to be combined as a sub group, execute processing, with respect to all the objects in the group to be combined, of making the same determination with respect to other objects based on the attribute of the object in the sub group, thereby sequentially increasing a member of the sub group.

Effect of the Third Exemplary Embodiment

By determining whether an object is a target to be combined or not by using attribute information of the object by making use of the fact that an attribute and an object height have correlation, the present exemplary embodiment enables objects to be combined even when they include an object whose height information is unclear in radio wave propagation estimation.

Fourth Exemplary Embodiment

Figure 8:
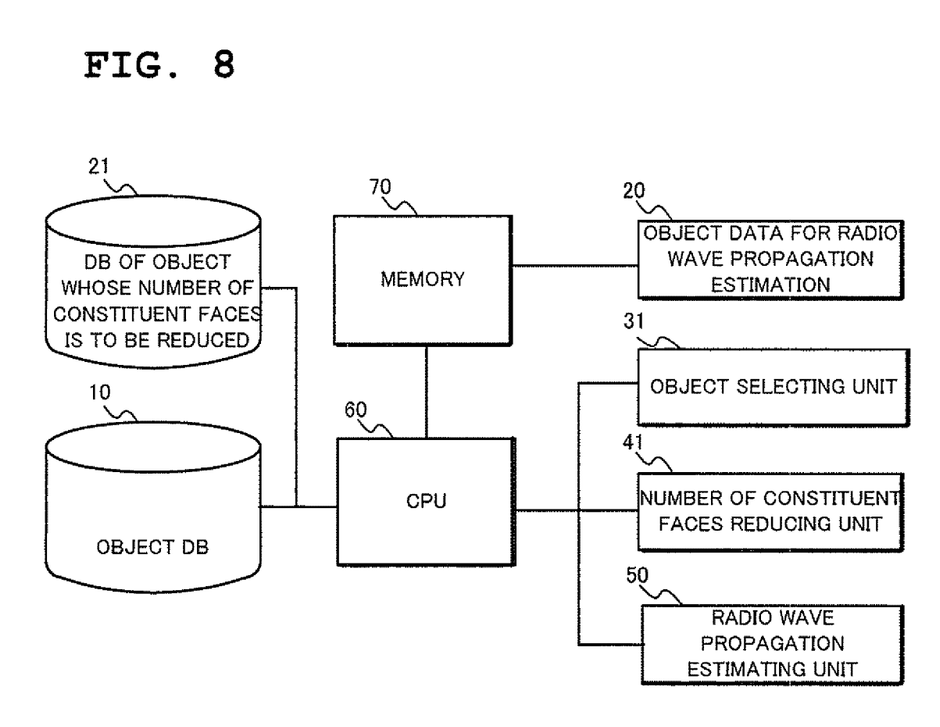
FIG. 8 is a functional block diagram showing a fourth exemplary embodiment of the radio wave propagation estimating system according to the present invention.

FIG. 8 is a functional block diagram showing a fourth exemplary embodiment of the radio wave propagation estimating system according to the present invention. With reference to FIG. 8, the fourth exemplary embodiment of the present invention includes the object data base (DB) 10, a data base (DB) 21 of object whose number of constituent faces is to be reduced, the object data 20 for radio wave propagation estimation, an object selecting unit 31, a number of constituent faces reducing unit 41, the radio wave propagation estimating unit 50, the control unit 60 and the memory 70.

The object DB 10 is the same as the object DB 10 shown in the first exemplary embodiment.

The data base (DB) 21 of object whose number of constituent faces is to be reduced is a data base where stored is data obtained by processing data stored in the object DB 10 by the number of constituent faces reducing unit 41 which will be described later.

The object data 20 for radio wave propagation estimation is data of an object in the surroundings of a transmission point which is to be taken into consideration in radio wave propagation estimation and is data processed by the object selecting unit 31 and the number of constituent faces reducing unit 41 which will be described later.

The number of constituent faces reducing unit 41 has a function of executing processing of reducing the number of constituent faces of an object stored in the object DB 10 and storing coordinate data of the processed object into the data base (DB) 21 of object whose number of constituent faces is to be reduced.

The object selecting unit 31 has a function of forming the object data 20 for radio wave propagation estimation by extracting, with respect to a region which has a large effect on an estimation precision, an object from the object DB 10 by using position data of a transmission point and with respect to a region which has a small effect on an estimation precision, extracting an object from the data base (DB) 21 of object whose number of constituent faces is to be reduced.

The radio wave propagation estimating unit 50, the control unit 60 and the memory 70 have the same functions as those recited in the first exemplary embodiment.

Figure 9:
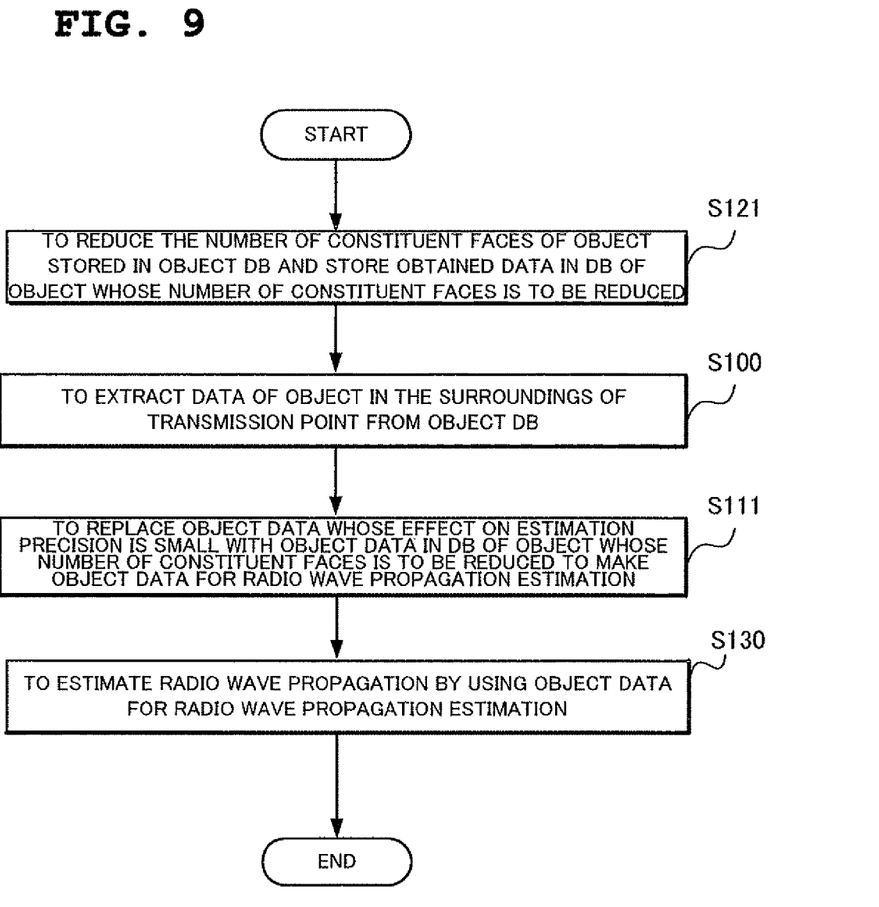
FIG. 9 is a flow chart showing the fourth exemplary embodiment of the radio wave propagation estimating system according to the present invention.

FIG. 9 is a flow chart showing operation of the fourth exemplary embodiment. According to the fourth exemplary embodiment of the present invention, first, execute processing of reducing the number of constituent faces of an object stored in the object DB 10 by the number of constituent faces reducing unit 41 and storing coordinate data of the processed object into the data base (DB) 21 of object whose number of constituent faces is to be reduced (Step S121). The specific method of reducing the number of constituent faces at Step S121 is the same as the method shown in Step S120 of the first exemplary embodiment.

Next, for estimating radio wave propagation, extract data of an object in the surroundings of a transmission point from the object DB 10 (Step S100).

Furthermore, select an object whose effect on an estimation precision is small by the object selecting unit 31 by using position data of the transmission point and replace the object with an object in the data base (DB) 21 of object whose number of constituent faces is to be reduced to form the object data 20 for radio wave propagation estimation (Step S111). A specific method of selecting an object at Step S111 is the same as the method shown in Step S110 of the first exemplary embodiment.

When the number of constituent faces is reduced by combining objects at Step S121, when all the objects in the same group in the data base (DB) 21 of object whose number of constituent faces is to be reduced are selected by the object selecting unit 31, replace the objects.

Furthermore, radio propagation is estimated by such a radio propagation estimating method as the above-described ray tracing method by using the object data 20 for radio wave propagation estimation by the radio wave propagation estimating unit 50 (Step S130).

Effect of the Fourth Exemplary Embodiment

The present exemplary embodiment has an advantage of improving working efficiency because with respect to object data and stored in the data base, data as of after reduction of the number of constituent faces is formed in advance, so that the amount of processing of reducing the number of constituent faces at the time of radio wave propagation estimation (the above-described Step S121) can be omitted.

While in the foregoing described exemplary embodiments, the radio propagation estimating method is used which takes outdoor and indoor structures into decision-theoretical consideration for the estimation of radio propagation characteristics, other radio wave propagation estimating methods can be used.

Although the present invention has been described with respect to the preferred modes of implementation and exemplary embodiments in the foregoing, the present invention is not necessarily limited to the above-described modes of implementation and exemplary embodiments and can be implemented in various forms without departing from the spirit and scope of its technical idea.

INCORPORATION BY REFERENCE

The present application claims priority based on Japanese Patent Application No. 2007-036340, filed on Feb. 16, 2007 and incorporates all the disclosure of the same.

INDUSTRIAL APPLICABILITY

The present invention is applicable to such usage as comprehension of a radio wave condition within a service area before a base station is disposed in the station positioning for mobile communication.

What is claimed is:

1. A radio wave propagation characteristic estimating system for estimating a radio wave propagation characteristic, comprising:
an object selecting unit for selecting, from objects within a region, an object whose effect on an estimation precision is small by using position data of a transmission point;
a number of constituent faces reducing unit for reducing the number of constituent faces of said object selected; and
a radio wave propagation estimating unit for estimating radio wave propagation by using an object not selected by said object selecting unit and an object whose number of constituent faces is reduced by said number of constituent faces reducing unit,
wherein said object selecting unit classifies said objects into objects within sight from a transmission point and objects out-of-sight,
wherein, when an object is classified as an object within sight, said object selecting unit selects the object when a distance from the transmission point to a representative point of the object is longer than a first distance, the first distance being a distance at which a propagation loss in free space will be an allowable propagation loss, and
wherein, when an object is classified as an object out-of-sight, said object selecting unit selects the object when the distance from the transmission point to the representative point of the object is longer than a second distance, the second distance being a distance at which a propagation loss defined by an estimation expression of an out-of-sight propagation loss with a distance as an argument will be an allowable propagation loss, the first distance being larger than the second distance,
wherein said number of constituent faces reducing unit:
reduces the number of constituent faces of only selected objects by generating a candidate group having a plurality of the selected objects, members of the candidate group have a distance between a member and at least one adjacent member being less than a predetermined distance, determining a maximum height and a minimum height of members of the candidate group, and maintaining members of the candidate group as a combined group when a difference between the maximum height and minimum height is less than a predetermined height threshold and combining members of the combined group into one object as a combined object,
reduces the number of constituent faces of only selected objects by deleting said object selected by said object selecting unit, and
reduces the number of constituent faces of only selected objects by simplifying a shape of said object selected by said object selecting unit.

2. The radio wave propagation characteristic estimating system according to claim 1, wherein said object selecting unit further selects an object when an altitude of the object is higher than an altitude of a transmission point.

3. The radio wave propagation characteristic estimating system according to claim 1, wherein a height of the combined object is an average height of the members of the combined group.

4. The radio wave propagation characteristic estimating system according to claim 1, wherein said number of constituent faces reducing unit further generates a sub-group from members of the candidate group based on relative heights of members of the candidate group, where two initial members of the sub-group have a relative height less than a second predetermined value.

5. A radio wave propagation characteristic estimating system for estimating a radio wave propagation characteristic, comprising:
a number of constituent faces reducing unit for reducing the number of constituent faces of an object in a region;
an object selecting unit for selecting, from objects within a region, an object whose effect on an estimation precision is small by using position data of a transmission point and replacing the object with an object whose said number of constituent faces is reduced; and
a radio wave propagation estimating unit for estimating radio wave propagation by using an object not selected by said object selecting unit and an object selected by said object selecting unit and replaced by an object whose said number of constituent faces is reduced, wherein said object selecting unit classifies said objects into objects within sight from a transmission point and objects out-of-sight, wherein, when an object is classified as an object within sight, said object selecting unit selects the object when a distance from the transmission point to a representative point of the object is longer than a first distance, the first distance being a distance at which a propagation loss in free space will be an allowable propagation loss, and wherein, when an object is classified as an object out-of-sight, said object selecting unit selects the object when the distance from the transmission point to the representative point of the object is longer than a second distance, the second distance being a distance at which a propagation loss defined by an estimation expression of an out-of-sight propagation loss with a distance as an argument will be an allowable propagation loss, the first distance being larger than the second distance, wherein said number of constituent faces reducing unit:
reduces the number of constituent faces of only selected objects by generating a candidate group having a plurality of the selected objects, members of the candidate group have a distance between a member and at least one adjacent member being less than a predetermined distance, determining a maximum height and a minimum height of members of the candidate group, and maintaining members of the candidate group as a combined group when a difference between the maximum height and minimum height is less than a predetermined height threshold and combining members of the combined group into one object as a combined object,
reduces the number of constituent faces of only selected objects by deleting objects, and
reduces the number of constituent faces of only selected objects by simplifying a shape of an object.

6. A radio wave propagation characteristic estimating method of estimating a radio wave propagation characteristic, comprising:
classifying objects within a region into objects within sight from a transmission point and objects out-of-sight;
selecting an object, when the object is classified as an object within sight and when a distance from the transmission point to a representative point of the object is longer than a first distance, the first distance being a distance at which a propagation loss in free space will be an allowable propagation loss to select an object whose effect on an estimation precision is small by using position data of a transmission point;
selecting an object, when the object is classified as an object out-of-sight and when the distance from the transmission point to the representative point of the object is longer than a second distance, the second distance being a distance at which a propagation loss defined by an estimation expression of an out-of-sight propagation loss with a distance as an argument will be an allowable propagation loss to select an object whose effect on an estimation precision is small by using position data of a transmission point, the first distance being larger than the second distance,
reducing the number of constituent faces of only the selected objects by generating a candidate group having a plurality of the selected objects, members of the candidate group have a distance between a member and at least one adjacent member being less than a predetermined distance, determining a maximum height and a minimum height of members of the candidate group, and maintaining members of the candidate group as a combined group when a difference between the maximum height and minimum height is less than a predetermined height threshold, and combining members of the combined group into one object as a combined object, deleting only said selected object, and simplifying a shape of only said selected object; and
estimating radio wave propagation by using an object not selected and an object whose number of constituent faces is reduced.

7. The radio wave propagation characteristic estimating method according to claim 6, wherein an object is further selected when an altitude of the object is higher than an altitude of a transmission point.

8. A radio wave propagation characteristic estimating method of estimating a radio wave propagation characteristic, comprising:
reducing the number of constituent faces of only selected objects by generating a candidate group having a plurality of the selected objects, members of the candidate group have a distance between a member and at least one adjacent member being less than a predetermined distance, determining a maximum height and a minimum height of members of the candidate group, and maintaining members of the candidate group as a combined group when a difference between the maximum height and minimum height is less than a predetermined height threshold and combining members of the combined group into one object as a combined object, deleting only selected objects, and simplifying a shape of only said selected object;
classifying objects within a region into objects within sight from a transmission point and objects out-of-sight;
selecting an object, when the object is classified as an object within sight and when a distance from the transmission point to a representative point of the object is longer than a first distance, the first distance being a distance at which a propagation loss in free space will be an allowable propagation loss to select an object whose effect on an estimation precision is small by using position data of a transmission point;
selecting an object, when the object is classified as an object out-of-sight and when the distance from the transmission point to the representative point of the object is longer than a second distance, the second distance being a distance at which a propagation loss defined by an estimation expression of an out-of-sight propagation loss with a distance as an argument will be an allowable propagation loss to select an object whose effect on an estimation precision is small by using position data of a transmission point, the first distance being larger than the second distance;
replacing the selected object with an object whose said number of constituent faces is reduced; and
estimating radio wave propagation by using an object not selected and an object selected and replaced by an object whose said number of constituent faces is reduced.

9. A non-transitory computer-readable storage medium storing a program for executing a radio wave propagation characteristic estimating processing of estimating a radio wave propagation characteristic, said program causes a computer to execute
classifying objects within a region into objects within sight from a transmission point and objects out-of-sight;
selecting an object, when the object is classified as an object within sight and when a distance from the transmission point to a representative point of the object is longer than a first distance, the first distance being a distance at which a propagation loss in free space will be an allowable propagation loss to select an object whose effect on an estimation precision is small by using position data of a transmission point;

selecting an object, when the object is classified as an object out-of-sight and when the distance from the transmission point to the representative point of the object is longer than a second distance, the second distance being a distance at which a propagation loss defined by an estimation expression of an out-of-sight propagation loss with a distance as an argument will be an allowable propagation loss to select an object whose effect on an estimation precision is small by using position data of a transmission point, the first distance being larger than the second distance;

reducing the number of constituent faces of only selected objects by generating a candidate group having a plurality of the selected objects, members of the candidate group have a distance between a member and at least one adjacent member being less than a predetermined distance, determining a maximum height and a minimum height of members of the candidate group, and maintaining members of the candidate group as a combined group when a difference between the maximum height and minimum height is less than a predetermined height threshold, and combining members of the combined group into one object as a combined object, deleting only said selected object, and simplifying a shape of only said selected object; and a radio wave propagation estimating processing of estimating radio wave propagation by using an object not selected and an object whose number of constituent faces is reduced.

10. The non-transitory computer-readable storage medium according to claim 9, wherein an object is further selected when an altitude of the object is higher than an altitude of a transmission point.

11. A non-transitory computer-readable storage medium storing a program for executing a radio wave propagation characteristic estimating processing of estimating a radio wave propagation characteristic, said program causes a computer to execute reducing the number of constituent faces of only selected objects by generating a candidate group having a plurality of the selected objects, members of the candidate group have a distance between a member and at least one adjacent member being less than a predetermined distance, determining a maximum height and a minimum height of members of the candidate group, and maintaining members of the candidate group as a combined group when a difference between the maximum height and minimum height is less than a predetermined height threshold, and combining members of the combined group into one object as a combined object, deleting only selected objects, and simplifying a shape of only said selected object;

classifying objects within a region into objects within sight from a transmission point and objects out-of-sight;

selecting an object, when the object is classified as an object within sight and when a distance from the transmission point to a representative point of the object is longer than a first distance, the first distance being a distance at which a propagation loss in free space will be an allowable propagation loss to select an object whose effect on an estimation precision is small by using position data of a transmission point;

selecting an object, when the object is classified as an object out-of-sight and when the distance from the transmission point to the representative point of the object is longer than a second distance, the second distance being a distance at which a propagation loss defined by an estimation expression of an out-of-sight propagation loss with a distance as an argument will be an allowable propagation loss to select an object whose effect on an estimation precision is small by using position data of a transmission point, the first distance being larger than the second distance;

replacing the selected object with an object whose said number of constituent faces is reduced; and estimating radio wave propagation by using an object not selected and an object selected and replaced by an object whose said number of constituent faces is reduced.

* * * * *